United States Patent
Matsuda

(10) Patent No.: US 12,278,513 B2
(45) Date of Patent: Apr. 15, 2025

(54) CHARGE/DISCHARGE CONTROL CIRCUIT AND BATTERY DEVICE

(71) Applicant: ABLIC Inc., Tokyo (JP)

(72) Inventor: Takashi Matsuda, Tokyo (JP)

(73) Assignee: ABLIC Inc., Nagano (JP)

( * ) Notice: Subject to any disclaimer, the term of this patent is extended or adjusted under 35 U.S.C. 154(b) by 500 days.

(21) Appl. No.: 17/516,724

(22) Filed: Nov. 2, 2021

(65) Prior Publication Data

US 2022/0181899 A1   Jun. 9, 2022

(30) Foreign Application Priority Data

Dec. 3, 2020  (JP) ................. 2020-200812

(51) Int. Cl.
*H02J 7/00*   (2006.01)
*H01M 10/46*   (2006.01)
*H01M 10/48*   (2006.01)

(52) U.S. Cl.
CPC ....... *H02J 7/007182* (2020.01); *H01M 10/46* (2013.01); *H01M 10/48* (2013.01); *H02J 7/0047* (2013.01); *H02J 7/0063* (2013.01)

(58) Field of Classification Search
CPC .. H02J 7/007182; H02J 7/0047; H02J 7/0063; H02J 7/00304; H02J 7/00306; H02J 7/0031; H02J 7/00302; H02J 7/0068; H02J 7/00712; H02J 7/007192; H02J 7/00309; H02J 7/0045; H01M 10/46; H01M 10/48; Y02E 60/10; G01R 19/16542
USPC ........................................................ 320/134
See application file for complete search history.

(56) References Cited

U.S. PATENT DOCUMENTS

| | | | | |
|---|---|---|---|---|
| 8,803,481 B2* | 8/2014 | Tachikawa | .......... | H02J 7/00714 320/135 |
| 2002/0079869 A1* | 6/2002 | Fujiwara | ................ | H02J 7/0031 320/157 |
| 2008/0169785 A1* | 7/2008 | Kim | .................. | H01M 10/4207 320/124 |
| 2009/0085521 A1* | 4/2009 | Kim | ...................... | H02J 7/0031 361/101 |
| 2018/0062410 A1* | 3/2018 | Sakurai | ................. | H02J 7/0068 |
| 2018/0309308 A1* | 10/2018 | Saito | ..................... | H02J 7/0031 |

FOREIGN PATENT DOCUMENTS

JP        2018183000        11/2018

* cited by examiner

*Primary Examiner* — Zixuan Zhou
(74) *Attorney, Agent, or Firm* — JCIPRNET

(57) ABSTRACT

A charge/discharge control circuit controls charging and discharging using a discharge control FET which opens and closes a discharge path and a charge control FET which opens and closes a charge path. The charge/discharge control circuit includes a charge/discharge monitoring circuit; and a control circuit, turning on and off the discharge control FET connected between a secondary cell and a load and the charge control FET connected between the discharge control FET and a charger in response to a detection signal from the charge/discharge monitoring circuit and a voltage of a negative electrode of the charger, and opening and closing the discharge path and the charge path. The control circuit turns off the discharge control FET and turns on the charge control FET, and then turns off the charge control FET when detecting that the voltage of the negative electrode of the charger reaches a predetermined voltage or higher.

4 Claims, 6 Drawing Sheets

CHARGE/DISCHARGE CONTROL CIRCUIT AND BATTERY DEVICE

CROSS-REFERENCE TO RELATED APPLICATIONS

This application claims the priority benefit of Japan Application No. 2020-200812, filed on Dec. 3, 2020. The entirety of the above-mentioned patent application is hereby incorporated by reference herein and made a part of this specification.

BACKGROUND

Technical Field

The present invention relates to a charge/discharge control circuit and a battery device.

Related Art

Generally, a battery device includes a charge/discharge control circuit which detects overdischarge, overcharge or the like and controls charging and discharging of a secondary cell in order to protect the secondary cell. The charge/discharge control circuit blocks a discharge path from the secondary cell to a load if overdischarge is detected, and blocks a charge path from a charger to the secondary cell if overcharge is detected.

In such a battery device, when a comparison is made between the magnitude of charge overcurrent caused by connection with an abnormal charger and the magnitude of discharge overcurrent caused by connection with an abnormal load, the discharge overcurrent is often larger than the charge overcurrent. Hence, a discharge control FET which opens and closes the discharge path is required to have high current resistance. On the other hand, as a charge control FET which opens and closes the charge path, an inexpensive one having lower current resistance than the discharge control FET may be used. For this reason, there has been proposed a charge/discharge control circuit which is able to separate the charge path and the discharge path and use a charge control FET having low current resistance and low cost (for example, see Japanese Patent Laid-Open No. 2018-183000).

However, in the charge/discharge control circuit that separates the charge path and the discharge path and controls charging and discharging of the battery device, in the case where the charger is connected and the charge control FET is turned on while the discharge control FET is turned off due to overcurrent or overdischarge or the like, when the load has low resistance and the charger has high equivalent series resistance, a voltage drop due to the load becomes small. Hence, when a voltage on a negative electrode side of the charger is increased, the charge control FET connected in series with the charge path on the negative electrode side of the secondary cell undergoes a decrease in gate-source voltage and an increase in ON resistance and generates heat. From the above, if energization continues in this state, deterioration may occur. Thus, in the conventional charge/discharge control circuit, it is necessary that the charger be prevented from being connected in a state in which the load is connected.

SUMMARY

In an aspect of the present invention, provided is a battery device which is able to, in the case where a charge path and a discharge path of a secondary cell are not the same, suppress heat generation of a charge control FET when a charger is connected in a state in which discharging to a load is stopped.

In accordance with an embodiment of the present invention, a charge/discharge control circuit controls charging and discharging of a secondary cell using a discharge control FET which is connected in series with a load and opens and closes a discharge path to the load and a charge control FET which is connected between the discharge control FET and a charger and opens and closes a charge path of the charger. The charge/discharge control circuit includes: a charge/discharge monitoring circuit, connected to a positive electrode and a negative electrode of the secondary cell and monitoring a charging and discharging state of the secondary cell; and a control circuit, in response to a detection signal from the charge/discharge monitoring circuit which indicates the charging and discharging state of the secondary cell and a voltage of a negative electrode of the charger, turning on and off the discharge control FET connected between the secondary cell and the load in the discharge path and the charge control FET connected between the discharge control FET and the charger in the charge path, and controlling opening and closing of the discharge path and the charge path. The control circuit turns off the discharge control FET and turns on the charge control FET, and then turns off the charge control FET when detecting that the voltage of the negative electrode of the charger is equal to or higher than a predetermined voltage.

In an aspect of the present invention, there can be provided a battery device which is able to, in the case where the charge path and the discharge path of the secondary cell are not the same, suppress heat generation of the charge control FET when the charger is connected in the state in which discharging to the load is stopped.

DESCRIPTION OF THE EMBODIMENTS

Hereinafter, an embodiment of the present invention is described with reference to the drawings.

Figure 1:
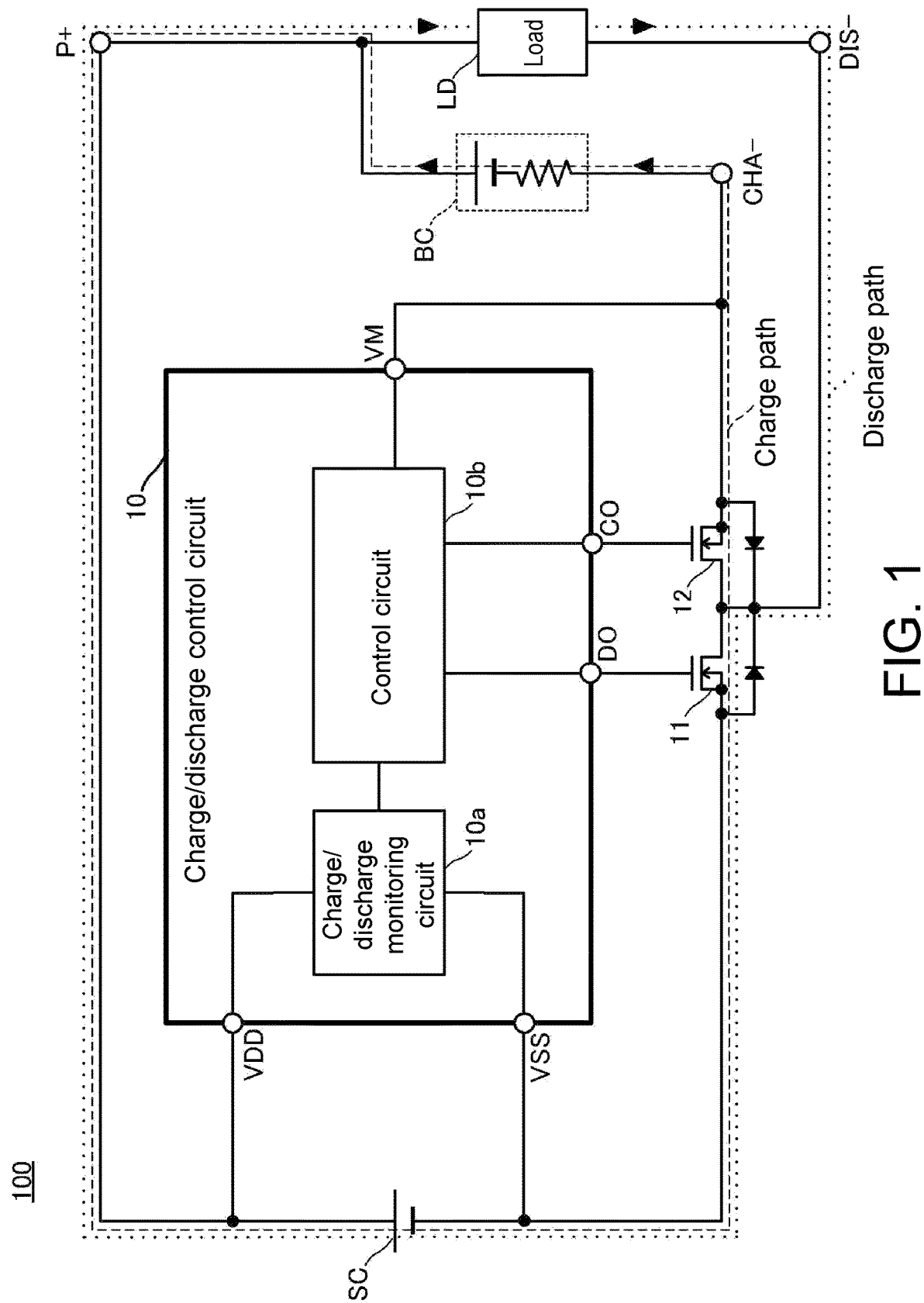
FIG. 1 is a block diagram illustrating a battery device according to an embodiment of the present invention.

FIG. 1 is a block diagram illustrating a battery device according to an embodiment of the present invention.

A battery device 100 of the present embodiment includes a secondary cell SC, a charge/discharge control circuit 10 connected to the secondary cell SC, a discharge control FET 11, a charge control FET 12, a charge/discharge terminal P+, a charge terminal CHA−, and a discharge terminal DIS−.

A charger BC is connected between the charge/discharge terminal P+ and the charge terminal CHA−, and a charge path illustrated by a broken line in FIG. 1 is formed. A load LD is connected between the charge/discharge terminal P+ and the discharge terminal DIS−, and a discharge path illustrated by a dotted line in FIG. 1 is formed. The battery device 100 is for operating a product to which the load LD is connected.

The charge/discharge control circuit 10 includes a positive power supply terminal VDD, a negative power supply terminal VSS, an external negative voltage input terminal VM, a discharge control terminal DO, a charge control terminal CO, a charge/discharge monitoring circuit 10a, and a control circuit 10b.

The positive power supply terminal VDD is connected to a positive electrode of the secondary cell SC, a positive electrode of the charger BC, and the charge/discharge terminal P+. The negative power supply terminal VSS is connected to a negative electrode of the secondary cell SC and the discharge control FET 11.

The charge/discharge monitoring circuit 10a is connected to the positive power supply terminal VDD and the negative power supply terminal VSS, and outputs an overcharge detection signal CONT_CO1 (not shown) to the control circuit 10b when detecting overcharge of the secondary cell SC. The charge/discharge monitoring circuit 10a outputs an overdischarge detection signal to the control circuit 10b when detecting overdischarge of the secondary cell SC.

When receiving the overcharge detection signal CONT_CO1 from the charge/discharge monitoring circuit 10a, the control circuit 10b outputs to the charge control terminal CO a charge prohibition signal which turns off the charge control FET 12. If charging of the secondary cell SC is permitted, the control circuit 10b outputs to the charge control terminal CO a charge permission signal which turns on the charge control FET 12.

When receiving the overdischarge detection signal from the charge/discharge monitoring circuit 10a, the control circuit 10b outputs to the discharge control terminal DO a discharge prohibition signal which turns off the discharge control FET 11. If discharging of the secondary cell SC is permitted, the control circuit 10b outputs to the discharge control terminal DO a discharge permission signal which turns on the discharge control FET 11.

The external negative voltage input terminal VM is a terminal detecting a voltage of the charge terminal CHA− in order to detect that the charger BC is connected, and is connected to the charge terminal CHA−.

The drain of the discharge control FET 11 is connected to the drain of the charge control FET 12, and the source of the discharge control FET 11 is connected to the negative electrode of the secondary cell SC. The gate of the discharge control FET 11 is connected to the discharge control terminal DO. The discharge control FET 11 is turned on and off by a discharge control signal CONT_DO output from the control circuit 10b.

Even if the discharge control FET 11 is turned off, a charging current flows inside the discharge control FET 11 through a parasitic diode.

The discharge control signal CONT_DO includes two types, i.e., the discharge prohibition signal and the discharge permission signal.

The drain of the charge control FET 12 is connected to the drain of the discharge control FET 11, and the source of the charge control FET 12 is connected to the charge terminal CHA−. The gate of the charge control FET 12 is connected to the discharge charge control terminal CO. The charge control FET 12 is turned on and off by a charge control signal CONT_CO (not shown) output from the control circuit 10b.

The charge control signal CONT_CO includes two types, i.e., the charge prohibition signal and the charge permission signal. The charge control signal CONT_CO is a result obtained by subjecting the overcharge detection signal CONT_CO1 and a later-described heat generation control signal CONT_CO2 to a logical operation.

Even if the charge control FET 12 is turned off, a discharging current flows inside the charge control FET 12 through a parasitic diode.

A connection part between the discharge control FET 11 and the charge control FET 12 is connected to one end of the load LD via the discharge terminal DIS−. This connection part is a junction of the charge path and the discharge path, the discharge control FET 11 is disposed in a common path of the charge path and the discharge path, and the charge control FET 12 is disposed only in the charge path.

In this way, based on the two types of detection signals from the charge/discharge monitoring circuit 10a and the voltage of the charge terminal CHA− detected by the external negative voltage input terminal VM, the control circuit 10b of the charge/discharge control circuit 10 outputs various control signals to the discharge control FET 11 and the charge control FET 12 respectively and controls charging and discharging of the secondary cell SC.

The control circuit 10b of the present embodiment, after receiving the overdischarge detection signal from the charge/discharge monitoring circuit 10a which detects overdischarge and turning off the discharge control FET 11 in a state in which the load LD is connected, is connected with the charger BC, outputs the heat generation control signal CONT_CO2 and turns on the charge control FET 12. In this case, when detecting that the voltage detected by the external negative voltage input terminal VM is equal to or higher than a predetermined voltage, the control circuit 10b outputs the heat generation control signal CONT_CO2 which turns off the charge control FET 12. Accordingly, the control circuit 10b turns off the charge control FET 12 and suppresses heat generation of the charge control FET 12.

The heat generation control signal CONT_CO2 includes two types of signals, i.e., a signal which turns on the charge control FET 12 and a signal which turns off the charge control FET 12.

In the following, heat generation of the charge control FET 12 and suppression of the heat generation will be described in detail.

First, considered is a current in the case where an overdischarged state is reached due to discharging to the load LD and the discharge control FET 11 is turned off, and then the charger BC is connected and the charge control FET 12 is turned on.

Figure 2:
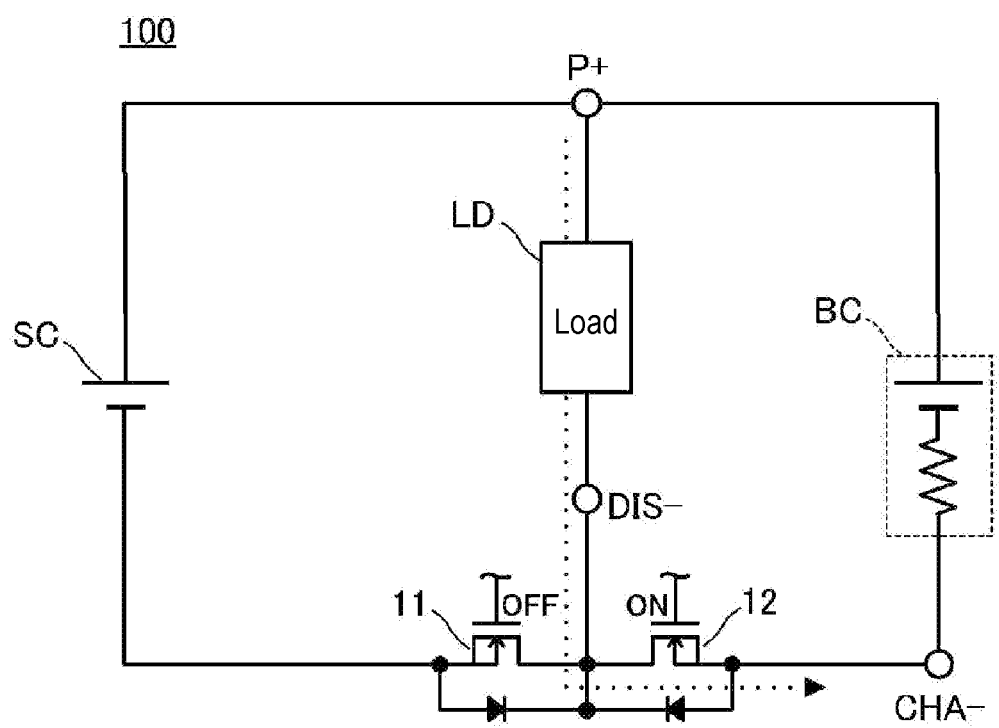
FIG. 2 is a circuit diagram illustrating a current in the case where a charger is connected after a discharge control FET is turned off in a state in which a load is connected in the present embodiment.

FIG. 2 is a circuit diagram illustrating a current in the case where a charger is connected after a discharge control FET is turned off in a state in which a load is connected in the present embodiment. In this case, when the load LD has low resistance and the charger BC has high equivalent series resistance, since a voltage drop due to the load LD becomes small, the current flows as illustrated by the broken line in FIG. 2, and the voltage of the discharge terminal DIS− and the charge terminal CHA− does not decrease to VSS. Then, in the charge control FET 12, a gate-source voltage decreases and ON resistance increases, and if energization continues in this state, heat may be generated. Hence, in a conventional charge/discharge control circuit, there is a risk that the charge control FET 12 may deteriorate.

Next, this state is described using a timing chart.

Figure 3:
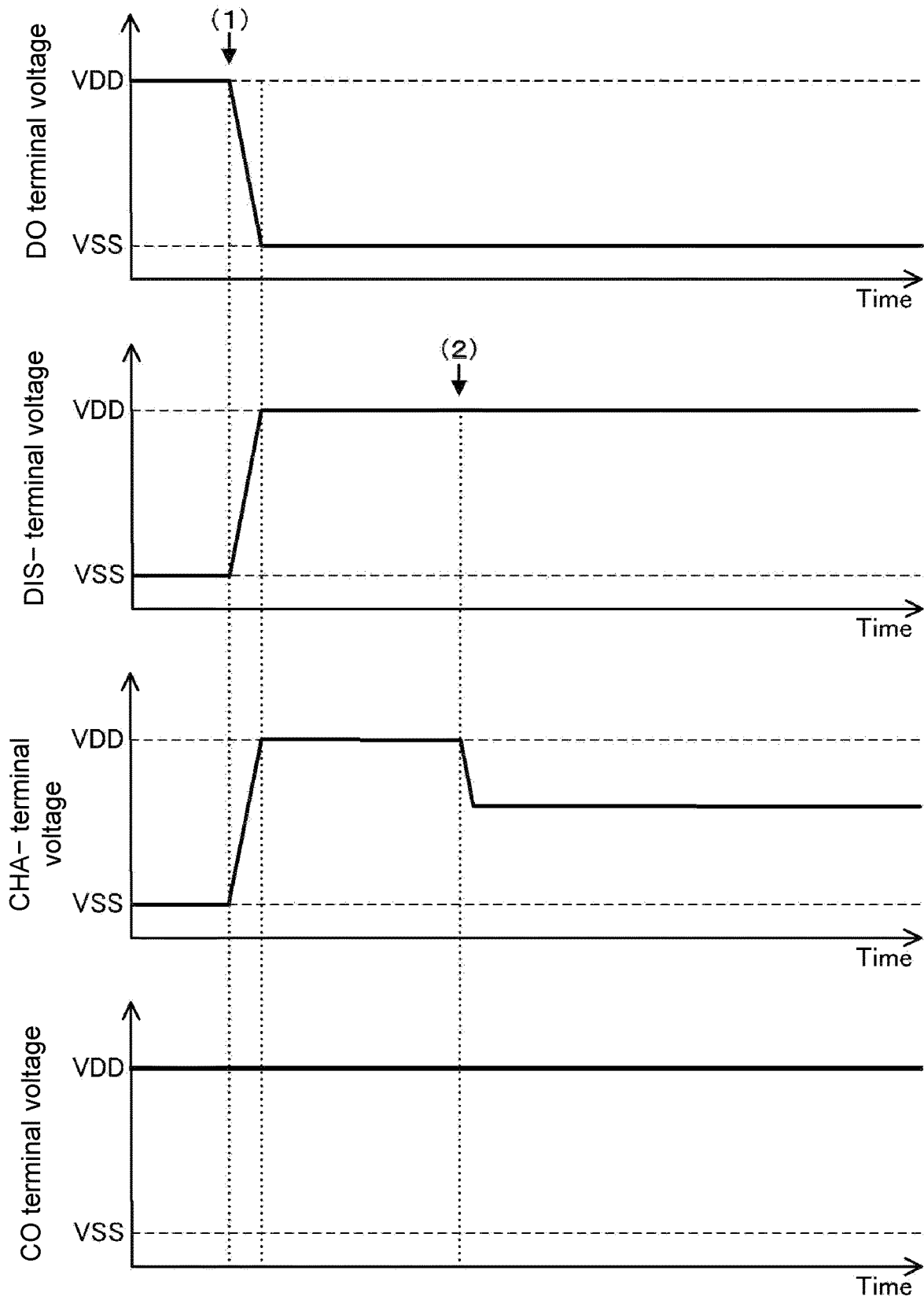
FIG. 3 is a timing chart in the case where a charger is connected after a discharge control FET is turned off in a state in which a load is connected in a conventional battery device.

FIG. 3 is a timing chart in the case where a charger is connected after a discharge control FET is turned off in a state in which a load is connected in the conventional charge/discharge control circuit.

In (1) in FIG. 3, when the discharge control FET 11 is turned off due to overcurrent or overdischarge or the like in the state in which the load LD is connected, since the load LD has low resistance, the voltage of the discharge terminal DIS− and the charge terminal CHA− rises to VDD. After that, when the charger BC is connected in (2) in FIG. 3, as described with FIG. 2, since the voltage of the charge terminal CHA− does not decrease to VSS, the gate-source voltage of the charge control FET 12 decreases. Then, the ON resistance of the charge control FET 12 increases, and if energization continues in this state, the charge control FET 12 may generate heat. Hence, in the conventional charge/discharge control circuit, it is necessary not to connect the load LD and the charger BC at the same time.

Thus, the control circuit 10*b* of the present embodiment outputs the heat generation control signal CONT_CO2 and controls ON and OFF of the charge control FET 12, so as to prevent the charge control FET 12 from generating heat.

Figure 4:
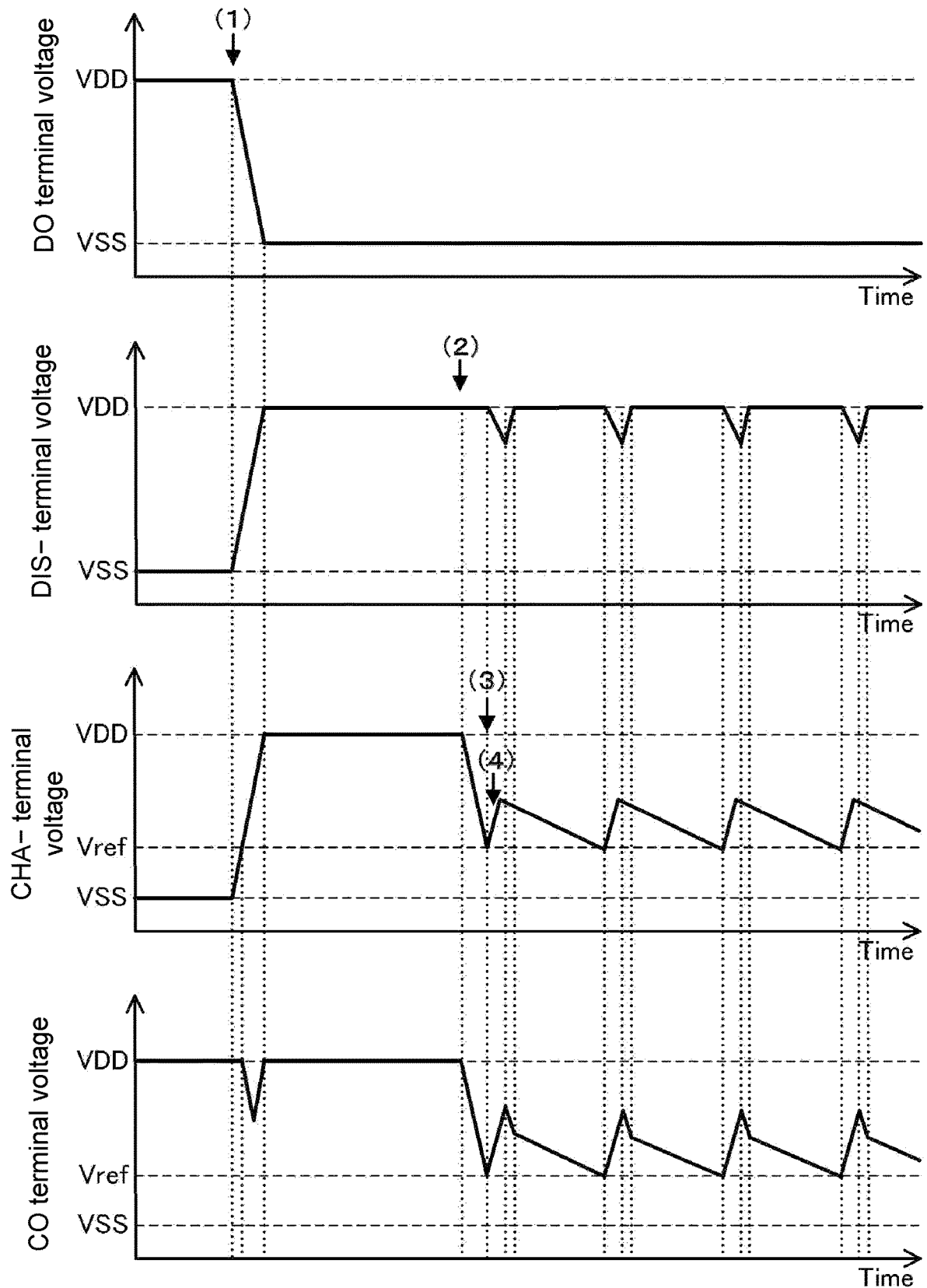
FIG. 4 is a timing chart in the case where a charger is connected after a discharge control FET is turned off in a state in which a load is connected in the present embodiment.

FIG. 4 is a timing chart in the case where a charger is connected after a discharge control FET is turned off in a state in which a load is connected in the present embodiment.

In (1) in FIG. 4, when the discharge control FET 11 is turned off due to overcurrent or overdischarge or the like in the state in which the load LD is connected, similarly to FIG. 3, the voltage of the discharge terminal DIS− and the charge terminal CHA− rises to the voltage of VDD. The control circuit 10*b*, which detects that the voltage of the charge terminal CHA− becomes equal to or higher than a reference voltage Vref, outputs the heat generation control signal CONT_CO2 and turns off the charge control FET 12. At this time, a CO terminal voltage drops to the voltage of the charge terminal CHA− and rises together with the voltage of the charge terminal CHA−.

After that, in (2) in FIG. 4, when the charger BC is connected, the voltage of the charge terminal CHA− drops. In (3) in FIG. 4, the control circuit 10*b*, which detects that the voltage of the charge terminal CHA− becomes lower than the reference voltage Vref as the predetermined voltage, outputs the heat generation control signal CONT_CO2 and turns on the charge control FET 12. Then, in (4) in FIG. 4, while the charger BC is connected to the charge/discharge control circuit 10, since the equivalent series resistance of the charger BC is large, the voltage of the charge terminal CHA− is accordingly increased. At this time, the control circuit 10*b*, which detects that the voltage of the charge terminal CHA− becomes equal to or higher than the reference voltage Vref, outputs the heat generation control signal CONT_CO2 and turns off the charge control FET 12.

Then, the control circuit 10*b*, which detects that the voltage of the charge terminal CHA− decreases and becomes lower than Vref, outputs the heat generation control signal CONT_CO2 and turns on the charge control FET 12, and (3) and (4) are repeated.

In this way, by turning on and off the charge control FET 12 in response to the voltage of the charge terminal CHA−, the control circuit 10*b* is able to suppress heat generation of the charge control FET 12.

Figure 5:
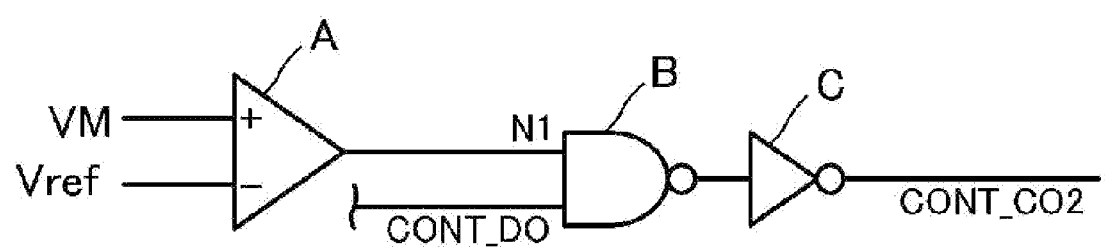
FIG. 5 is a circuit diagram illustrating a part of a control circuit according to the present embodiment.

FIG. 5 is a circuit diagram illustrating a part of a control circuit according to the present embodiment, and is an example of a part of a circuit diagram realizing the timing chart illustrated in FIG. 4.

As illustrated in FIG. 5, the control circuit 10*b* includes a comparator A which compares the reference voltage Vref generated from a reference voltage generation circuit provided inside the control circuit 10*b* and the voltage of the external negative voltage input terminal VM, a NAND gate B which receives output N1 of the comparator A and the discharge control signal CONT_DO, and a NOT gate C which inverts the output from the NAND gate B and outputs the same as the heat generation control signal CONT_CO2.

The heat generation control signal CONT_CO2 output from downstream of the NOT gate C is subjected to a logical operation together with the overcharge detection signal CONT_CO1 of the charge/discharge monitoring circuit 10*a* and output to the charge control terminal CO.

If the discharge control signal CONT_DO is a discharge prohibition signal, the control circuit 10*b* outputs the heat generation control signal CONT_CO2 corresponding to a result of the comparison between the voltage of the external negative voltage input terminal VM and the reference voltage Vref. Thereby, the timing chart illustrated in FIG. 4 can be realized.

In this way, in the charge/discharge control circuit 10 of the present embodiment, in the case where the charger BC is connected and the charge control FET 12 is turned on after the discharge control FET 11 is turned off due to overcurrent or overdischarge or the like, even when the load LD has low resistance and the charger BC has high equivalent series resistance, heat generation of the charge control FET 12 can be suppressed.

In the charge/discharge control circuit 10 of the present embodiment, as illustrated in FIG. 4, since the charge control signal CONT_CO is in an oscillation state, the charge control FET 12 may not be turned on when the charge control FET 12 is generating heat. Specifically, as illustrated in FIG. 6, an additional circuit may be added to a part of the control circuit 10*b* of FIG. 5 so that the charge control FET 12 is not turned on for a certain period of time.

<Modifications of Part of Control Circuit>

Figure 6:
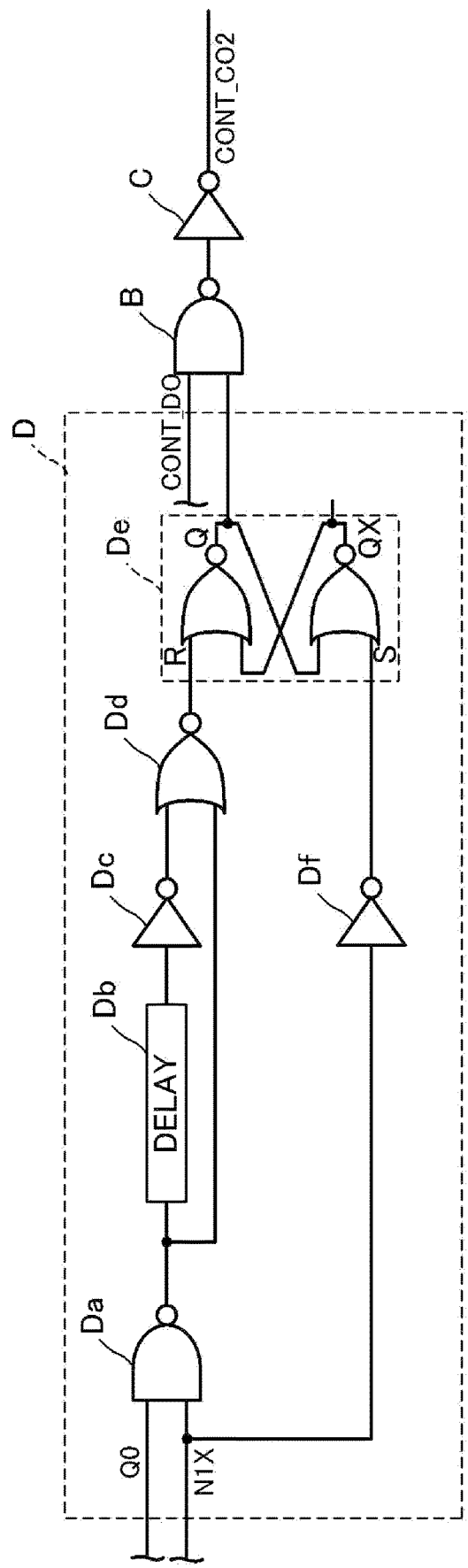
FIG. 6 is a circuit diagram illustrating a modification of a part of a control circuit according to the present embodiment.

FIG. 6 is a circuit diagram illustrating a modification of a part of a control circuit according to the present embodiment.

As illustrated in FIG. 6, the control circuit 10*b* includes an additional circuit D in addition to the NAND gate B and the NOT gate C illustrated in FIG. 5.

The description of the NAND gate B and the NOT gate C is the same as the description given for FIG. 5 and is therefore omitted.

The additional circuit D delays a charge control signal which turns on the charge control FET 12 by a certain period of time after it is detected that the voltage of the negative electrode of the charger BC is equal to or higher than the predetermined voltage and the charge control FET 12 is turned off. The additional circuit D includes a NAND gate Da, a delay part Db, a NOT gate Dc, a NOR gate Dd, a flip-flop De, and a NOT gate Df.

The NAND gate Da receives a signal N1X obtained by inverting the output of the comparator A and a clock output signal Q0, and outputs the same to the delay part Db and the NOR gate Dd. The delay part Db delays the output of the NAND gate Da by a certain period of time, and outputs the same to the NOR gate Dd via the NOT gate Dc.

The delay part Db may be, for example, an RC filter, or may be formed by combining a clock, a counter or the like.

One terminal of the NOR gate Dd directly receives the output from the NAND gate Da, and the other terminal of the NOR gate Dd receives the output from the NAND gate Da which has passed through the delay part Db and the NOT gate Dc, and outputs the same to the flip-flop De.

By the delay part Db, the NOT gate Dc, and the NOR gate Dd, a so-called one pulse generation circuit is formed.

The flip-flop De receives the output from the NOR gate Dd and the signal N1X via the NOT gate Df, and outputs the same to the NAND gate B.

The flip-flop De of the present modification uses a NOR gate. However, the present invention is not limited thereto, and may also use, for example, a NAND gate.

In the additional circuit D, by setting the flip-flop De by the signal N1X received by the NAND gate Da, and by the one pulse generation circuit outputting one pulse when the clock output signal Q0 changes from an L level to a H level, the flip-flop De is reset.

In this way, in the modification of a part of the control circuit 10b illustrated in FIG. 6, after the control FET 12 is turned off, by making the charge control FET 12 unable to be controlled to be on for a certain period of time, heat generation of the charge control FET 12 can be more reliably suppressed.

Although one embodiment of the present invention has been described above, it goes without saying that the present invention is not limited to the above-described embodiment, and various changes or combinations can be made without departing from the spirit of the present invention.

In the present embodiment, the discharge control FET 11 and the charge control FET 12 are connected to the negative electrode side of the secondary cell SC. However, the present invention is not limited thereto, and the discharge control FET 11 and the charge control FET 12 may be connected to the positive electrode side of the secondary cell SC. If the discharge control FET 11 and the charge control FET 12 are connected to the positive electrode side of the secondary cell SC, it is necessary to set the discharge control FET 11 and the charge control FET 12 to Pch.

What is claimed is:

1. A charge/discharge control circuit, controlling charging and discharging of a secondary cell using a discharge control FET which is connected in series with a load and opens and closes a discharge path to the load and a charge control FET which is connected between the discharge control FET and a charger and opens and closes a charge path of the charger, wherein the charge/discharge control circuit comprises:
   a charge/discharge monitoring circuit, connected to a positive electrode and a negative electrode of the secondary cell and monitoring a charging and discharging state of the secondary cell; and
   a control circuit, in response to a detection signal from the charge/discharge monitoring circuit which indicates the charging and discharging state of the secondary cell and a voltage of a negative electrode of the charger, turning on and off the discharge control FET connected between the secondary cell and the load in the discharge path and the charge control FET connected between the discharge control FET and the charger in the charge path, and controlling opening and closing of the discharge path and the charge path, wherein
   the control circuit turns off the discharge control FET while the load is connected, and turns on the charge control FET in response to the charger being connected, and then turns off the charge control FET when detecting that the voltage of the negative electrode of the charger is equal to or higher than a predetermined voltage,
   wherein after the charger is connected and the charging control FET is turned on, a voltage drop due to the load becomes small.

2. The charge/discharge control circuit according to claim 1, wherein the control circuit further comprises a delay circuit, the delay circuit delaying a signal which turns on the charge control FET by a certain period of time after it is detected that the voltage of the negative electrode of the charger is equal to or higher than the predetermined voltage and the charge control FET is controlled to be turned off.

3. A battery device, comprising:
   a secondary cell;
   a charge/discharge terminal and a charge terminal to which a load is connected;
   a charge control FET, one end of which being connected to the charge terminal;
   a discharge control FET, one end of which being connected to the other end of the charge control FET and the other end of which being connected to a negative electrode of the secondary cell;
   an external negative voltage input terminal connected to the charge control FET; and
   the charge/discharge control circuit according to claim 1, connected to the secondary cell, the charge control FET, the discharge control FET, the charge/discharge terminal and the external negative voltage input terminal.

4. A battery device, comprising:
   a secondary cell;
   a charge/discharge terminal and a charge terminal to which a load is connected;
   a charge control FET, one end of which being connected to the charge terminal;
   a discharge control FET, one end of which being connected to the other end of the charge control FET and the other end of which being connected to a negative electrode of the secondary cell;
   an external negative voltage input terminal connected to the charge control FET; and
   the charge/discharge control circuit according to claim 2, connected to the secondary cell, the charge control FET, the discharge control FET, the charge/discharge terminal and the external negative voltage input terminal.

* * * * *